United States Patent
Aabye

(10) Patent No.: US 12,500,766 B2
(45) Date of Patent: Dec. 16, 2025

(54) TOKENIZING TRANSACTIONS USING SUPPLEMENTAL DATA

(71) Applicant: Visa International Service Association, San Francisco, CA (US)

(72) Inventor: Andreas Aabye, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 305 days.

(21) Appl. No.: 18/186,840

(22) Filed: Mar. 20, 2023

(65) Prior Publication Data

US 2023/0308278 A1 Sep. 28, 2023

Related U.S. Application Data

(60) Provisional application No. 63/323,039, filed on Mar. 23, 2022.

(51) Int. Cl.
*H04L 9/32* (2006.01)
*G06Q 20/38* (2012.01)
*G06Q 20/40* (2012.01)

(52) U.S. Cl.
CPC ....... *H04L 9/3213* (2013.01); *G06Q 20/3821* (2013.01); *G06Q 20/40* (2013.01)

(58) Field of Classification Search
None
See application file for complete search history.

(56) References Cited

U.S. PATENT DOCUMENTS

| | | | |
|---|---|---|---|
| 2017/0316405 A1* | 11/2017 | Lonni | G06Q 20/3674 |
| 2021/0019742 A1* | 1/2021 | Pontious | G06Q 20/403 |
| 2021/0110469 A1* | 4/2021 | Ross | G06F 21/6218 |
| 2022/0036452 A1* | 2/2022 | Schmidt | G06Q 40/03 |
| 2023/0004974 A1* | 1/2023 | Poon | H04L 63/0807 |
| 2023/0119691 A1* | 4/2023 | Kurian | H04L 9/3213 |
| | | | 713/164 |

FOREIGN PATENT DOCUMENTS

WO 2021/119619 A1 6/2021

* cited by examiner

*Primary Examiner* — Scott B Christensen
(74) *Attorney, Agent, or Firm* — Kilpatrick Townsend & Stockton LLP

(57) ABSTRACT

A method is disclosed. The method includes receiving, from a resource provider computer, a token request message comprising a credential, after a user provides the credential to the resource provider computer. The method also includes transmitting, to the resource provider computer, a token response message comprising one or more supplemental data identifiers and one or more tokens associated with the one or more supplemental data identifiers. The one or more tokens are linked to the credential. Then, a user selects a supplemental data identifier. The method also comprises receiving, from the resource provider computer, an authorization request message comprising a token of the one or more tokens, the token linked to the selected supplemental data identifier, and a value, determining the credential using the token; and transmitting, to an authorizing entity computer, a modified authorization request message comprising the credential, the value, and the supplemental data identifier.

20 Claims, 6 Drawing Sheets

TOKENIZING TRANSACTIONS USING SUPPLEMENTAL DATA

CROSS-REFERENCES TO RELATED APPLICATIONS

This application is a non-provisional application, which claims priority to U.S. Provisional Application No. 63/323,039, filed on Mar. 23, 2022, which is herein incorporated by reference in its entirety for all purposes.

BACKGROUND

Interactions between users and resource providers may sometimes require authorizations by authorizing entity computers. In some cases, the communication protocols between the resource provider computers, transport computers, processing computers, and the authorizing entity computers are a fixed, and messages transmitted using such protocols can have size limits. As a result, the functionality of systems that include computers such as these can be limited. Any changes to the system to include new functionality would require significant changes to each of the computers.

Another problem that needs to be addressed is associated with the security of information that is transmitted by the resource provider computers. Sensitive credentials such as user identification information, account numbers, etc., can be subject to hacking and man-in-the-middle attacks when possessed by resource providers.

Embodiments of the disclosure address this problem and other problems individually and collectively.

SUMMARY

One embodiment of the invention is directed to a method comprising: receiving, by a service provider computer from a resource provider computer, a token request message comprising a credential, after a user provides the credential to the resource provider computer; transmitting, by the service provider computer to the resource provider computer, a token response message comprising one or more supplemental data identifiers and one or more tokens associated with the one or more supplemental data identifiers, the one or more tokens linked to the credential, wherein the user thereafter selects a supplemental data identifier; receiving, by the service provider computer from the resource provider computer, an authorization request message comprising a token of the one or more tokens, the token linked to the selected supplemental data identifier, and a value; determining, by the service provider computer, the credential using the token; and transmitting, by the service provider computer to an authorizing entity computer, a modified authorization request message comprising the credential, the value, and the supplemental data identifier.

Another embodiment of the invention includes a service provider computer comprising: a processor; and a non-transitory computer readable medium comprising code, executable by the processor, to perform operations comprising: receiving, from a resource provider computer, a token request message comprising a credential, after a user provides the credential to the resource provider computer; transmitting, to the resource provider computer, a token response message comprising one or more supplemental data identifiers and one or more tokens associated with the one or more supplemental data identifiers, the one or more tokens linked to the credential, wherein the user thereafter selects a supplemental data identifier; receiving, from the resource provider computer, an authorization request message comprising a token of the one or more tokens, the token linked to the selected supplemental data identifier, and a value; determining the credential using the token; and transmitting, to an authorizing entity computer, a modified authorization request message comprising the credential, the value, and the supplemental data identifier.

Another embodiment of the invention includes a method comprising: receiving, by token service computer from a service provider computer, a credential and the one or more supplemental data identifiers; providing, by the token service computer to the service provider computer, one or more tokens linked to the one or more supplemental data identifiers, and the one or more supplemental data identifiers linked to one or more pieces of supplemental data; receiving, by the token service computer from the service provider computer, a de-tokenization request message comprising a selected token of the one or more tokens; and transmitting, by the token service computer to the service provider computer, the credential associated with the selected token, wherein the service provider computer thereafter transmits a modified authorization request message with the credential, a supplemental data identifier selected by a user, and an amount to an authorizing entity computer.

Another embodiment of the invention includes a token service computer comprising: a processor; and a non-transitory computer-readable medium coupled to the processor. The non-transitory computer-readable medium comprises code, executable by the processor, to perform a method comprising: receiving, from a service provider computer, a credential and the one or more supplemental data identifiers; providing, to the service provider computer, one or more tokens linked to the one or more supplemental data identifiers, and the one or more supplemental data identifiers linked to one or more pieces of supplemental data; receiving, from the service provider computer, a de-tokenization request message comprising a selected token of the one or more tokens; and transmitting, to the service provider computer, the credential associated with the selected token, wherein the service provider computer thereafter transmits a modified authorization request message with the credential, a supplemental data identifier selected by a user, and an amount to an authorizing entity computer.

A better understanding of the nature and advantages of embodiments of the invention may be gained with reference to the following detailed description and accompanying drawings.

DETAILED DESCRIPTION

Figure 1:
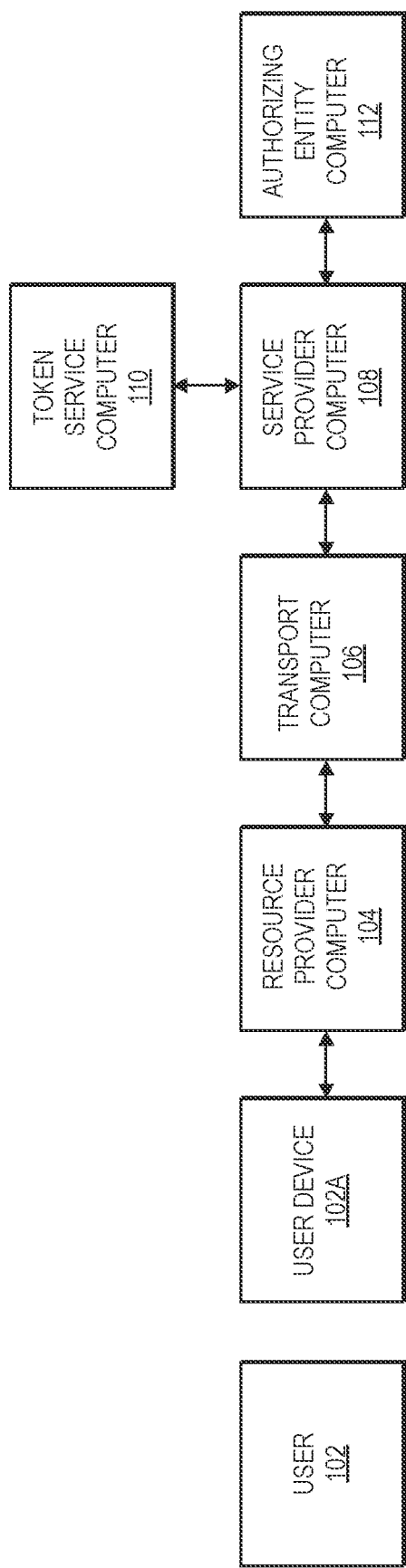
FIG. 1 shows a block diagram of a transaction processing system according to an embodiment.

Prior to discussing embodiments of the invention, some terms can be described in further detail.

A "key" may include a piece of information that is used in a cryptographic algorithm to transform input data into another representation. A "key" or "cryptographic key" can be a symmetric or an asymmetric key.

A "cryptographic algorithm" can be an encryption algorithm that transforms original plaintext data into an alternate representation, or a decryption algorithm that transforms encrypted information back to the original plaintext data. Examples of cryptographic algorithms may include triple data encryption standard (TDES), data encryption standard (DES), advanced encryption standard (AES), etc.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer.

A "resource provider" may be an entity that can provide a resource such as goods, services, information, and/or access to a location (e.g., a parking space, a transit terminal, etc.). Examples of resource providers include merchants, governmental authorities, secure data providers, etc. A resource provider may operate one or more resource provider computers. Examples of resource provider computers can include access devices and backend resource provider server computers.

An "access device" may be any suitable device that provides access to a resource. An access device may be in any suitable form. Some examples of access devices include vending machines, kiosks, POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), and the like. An access device may use any suitable contact or contactless mode of operation to send or receive data from, or associated with, a user mobile communication device. In some embodiments, an access device may include a reader, a processor, and a computer-readable medium. A reader may include any suitable contact or contactless mode of operation. For example, exemplary readers can include radio frequency (RF) antennas, optical scanners, bar code readers, or magnetic stripe readers to interact with a payment device and/or mobile communication device.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer."

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "user" may include an individual. In some embodiments, a user may be associated with one or more personal accounts and/or user devices.

A "user device" may be any suitable device that can interact with a user device (e.g., a payment device such as a payment card or mobile phone). User devices may be in any suitable form. Some examples of user devices include cellular phones, PDAs, personal computers (PCs), tablet computers, and the like. In some embodiments, where a user device is a mobile device, the mobile device may include a display, a memory, a processor, a computer-readable medium, and any other suitable component.

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. A payment device may be used to make a payment transaction. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of mobile communication devices include pagers, payment cards, security cards, access cards, smart media, transponders, and the like. If the payment device is in the form of a debit, credit, or smartcard, the payment device may also optionally have features such as magnetic stripes. Such devices can operate in either a contact or contactless mode. In some embodiments, a mobile communication device can function as a payment device (e.g., a mobile communication device can store and be able to transmit payment credentials for a transaction).

A "mobile device" (sometimes referred to as a mobile communication device) may comprise any suitable electronic device that may be transported and operated by a user, which may also provide remote communication capabilities to a network. A mobile communication device may communicate using a mobile phone (wireless) network, wireless data network (e.g., 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g., cellular phones), PDAs, tablet computers, net books, laptop computers, wearable devices (e.g., watches), vehicles such as automobiles and motorcycles, personal music players, handheld specialized readers, etc. A mobile device may comprise any suitable hardware and software for performing such functions, and may also include multiple devices or components (e.g., when a device has remote access to a network by tethering to another device—i.e., using the other device as a modem—both devices taken together may be considered a single mobile device).

A "credential" may be any suitable information that serves as reliable evidence of worth, ownership, identity, or authority. A credential may be a string of numbers, letters, or any other suitable characters that may be present or contained in any object or document that can serve as confirmation.

A "value credential" may be information associated with worth. Examples of value credentials include payment credentials, coupon identifiers, information needed to obtain a promotional offer, etc.

"Payment credentials" may include any suitable information associated with an account (e.g., a payment account and/or payment device associated with the account). Such information may be directly related to the account or may be derived from information related to the account. Examples of account information may include a PAN (primary account number or "account number"), username, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a username, an expiration date, a gift card number or code, and any other suitable information.

A "token" may be a substitute value for a credential. A token may be a string of numbers, letters, or any other suitable characters. Examples of tokens include access tokens such as payment tokens, data that can be used to access secure systems or locations, etc.

A "payment token" may include an identifier for a payment account that is a substitute for an account identifier, such as a primary account number (PAN) and/or an expiration date. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which sensitive data is replaced with substitute data. For example, a real credential (e.g., a primary account number (PAN)) may be tokenized by replacing the real account identifier with a substitute number that may be associated with the real credential. Further, tokenization can be applied to any other information to substitute the underlying information with a token. "Token exchange" or "de-tokenization" can be a process of restoring the data that was substituted during tokenization. For example, a token exchange may include replacing a payment token with its associated primary account number (PAN). Further, de-tokenization or token exchange may be applied to any other information to retrieve the substituted information from a token. In some embodiments, token exchange can be achieved via a transactional message, such as an ISO message, an application programming interface (API), or another type of web interface (e.g., web request).

A "token service computer" can include a system that that services tokens. In some embodiments, a token service computer can facilitate requesting, determining (e.g., generating) and/or issuing tokens, as well as maintaining an established mapping of tokens to primary account numbers (PANs) in a repository (e.g., token vault). In some embodiments, the token service computer may establish a token assurance level for a given token to indicate the confidence level of the token to PAN binding. The token service computer may include or be in communication with a token vault where the generated tokens are stored. The token service computer may support token processing of payment transactions submitted using tokens by de-tokenizing the token to obtain the actual PAN.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e., token domain restriction controls) may be established as part of token issuance by the token service computer that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

"Token expiry date" may refer to the expiration date/time of the token. The token expiry date may be passed among the entities of the tokenization ecosystem during transaction processing to ensure interoperability. The token expiration date may be a numeric value (e.g., a 4-digit numeric value). In some embodiments, the token expiry date can be expressed as a time duration as measured from the time of issuance.

A "token request message" may be an electronic message for requesting a token. A token request message may include information usable for identifying a payment account or digital wallet, and/or information for generating a payment token. For example, a token request message may include payment credentials, mobile communication device identification information (e.g., a phone number or MSISDN), a digital wallet identifier, information identifying a tokenization service provider, a merchant identifier, a cryptogram, and/or any other suitable information. Information included in a token request message can be encrypted (e.g., with an issuer-specific key). In some embodiments, the token request message may include a flag or other indicator specifying that the message is a token request message.

A "token response message" may be a message that responds to a token request. A token response message may include an indication that a token request was approved or denied. A token response message may also include a payment token, mobile communication device identification information (e.g., a phone number or MSISDN), a digital wallet identifier, information identifying a tokenization service provider, a merchant identifier, a cryptogram, and/or any other suitable information. Information included in a token response message can be encrypted (e.g., with an issuer-specific key). In some embodiments, the token response message may include a flag or other indicator specifying that the message is a token response message.

An "authorization request message" may be a message that requests permission to conduct an interaction. For example, an authorization request message may include an electronic message that is sent to a payment processing network and/or an issuer of a payment card to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. In some embodiments, it may be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As noted above, in some embodiments, a payment processing network may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

An "interaction" can be a reciprocal action, effect, or influence. An interaction, for example, could be an exchange or transaction between two or more parties. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

An "installment plan" or "installments plan" may be a scheme for dividing something across two or more events based on an installment time. For example, the event may be paying for a portion of a total amount, and the installment time may be a month (e.g., for monthly payments). In some cases, an installment plan may be linked to a new, unique line of credit.

"Supplemental data" can include any suitable information that supplements an interaction. In some embodiments, supplemental data can include data associated with an installment plan, data associated with a user, data associated authentication procedures, etc.

"Supplemental data identifiers" can include identifiers that can identify supplemental data. For instance, a supplemental data identifier can be an installment plan identifier such as "plan A" or an alphanumeric code such as "X1838F".

A "cryptogram" may include a piece of obscured text such as encrypted text. A cryptogram may be formed by encrypting input data with an encryption key such as a symmetric encryption key. In some embodiments, a cryptogram is reversible so that the inputs that are used to form the cryptogram can be obtained using the same symmetric key to perform a decryption process. In some embodiments, if input data is encrypted using a private key of a public/private key pair, the cryptogram may also be a digital signature. A digital signature may be verified with a public key of the public/private key pair. In some embodiments, a cryptogram may include a dCVV (dynamic card verification value).

As noted above, interactions between users and resource providers may sometimes require authorizations by authorizing entity computers. In some cases, the communication protocols between the resource providers, transport computers, processing computers, and the authorizing entity computers are fixed and messages can be of limited size. As a result, the functionality of such systems can be limited. Any changes to the system to include new functionality would require significant changes to teach of the previously mentioned computers.

As an example, installment plans are an option for resolving interactions such as payment for goods or services. It would be desirable to provide for the ability to integrate installment plans with typical payment card transactions. For example, during an installment plan, payments by a user for a purchase transaction at a resource provider such as a merchant may be spread out over fixed intervals, instead of all at once. In some embodiments, an installment plan may be offered or serviced by a service provider that operates a service provider computer. In other use cases, other entities may offer plans to a user.

During an interaction such as a payment card transaction, if an installment plan is to be selected by the user, data regarding the selection is added to a data field in an authorization request message. The data regarding the selection can be supplemental data associated with the transaction. When new data and/or a new data field is added to an authorization request message, entities such as acquirer banks need to update their systems and software to support the data and/or new data field. This can be problematic as there are hundreds of different acquirer banks, and they all individually need to update their systems and software to support the new data and data fields. Further, if an acquirer bank fails to update their system and/or software, then the installment plan may not be available to the user.

Embodiments of the invention can use a token service computer to provide a token in response to a selection by a user. In some embodiments, the selection can be an installment plan selection. The installment plan selection can be an example of a supplemental data identifier. After the user selects an installment plan during a transaction, a message including a user's credential and the selected installment plan is sent to a service provider computer. The service provider computer can then obtain a token and can link it to the installment plan and the credential.

The token is then provided back to the resource provider (e.g., a merchant) that is conducting the transaction. The token can be used in an authorization request message generated by the resource provider instead of a primary account number (PAN). The authorization request message is then transmitted to a service provider computer via a transport computer as in conventional payment card transactions. In some embodiments, the service provider computer can be a computer in a payment processing network that performs clearing and settlement processing. The service provider computer can then de-tokenize the token to obtain the credential and can identify the transaction as one that is associated with the selected installment plan. The authorization request message with the credential and the selected installment plan can then be forwarded to an authorizing entity computer for authorization. The data relating to the installment plan can be an example of supplemental data. The authorizing entity computer can also store the indication of the installment plan and can implement it later.

Although installment plans as supplemental data and installment plan indicators as being supplemental data identifiers are discussed in detail, embodiments of the invention are not limited thereto. For example, other examples of supplemental data can include authentication data associated with the user that may be held by the service provider computer, data that increases the speed of processing authorization request messages, authentication processes selected by the user, rewards program information associated with a reward program selected by the user, etc.

FIG. 1 shows a block diagram of a system according to an embodiment of the invention. FIG. 1 shows a user 102 that can operate a user device 102A. The user 100 may use the user device 102A to access a resource provider by a resource provider operating the resource provider computer 104. For example, the user 100 can use a user device 102A to pay for a good or service at a resource provider such as a merchant.

The resource provider computer 104 can be in communication with an authorizing entity computer 112 via a transport computer and a service provider computer 108. The service provider computer 108 can be in communication with a token service computer 110.

In some embodiments, the service provider computer 104 can be a processing network computer in a payment processing network and may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

Prior to interactions being conducted, the authorizing entity computer 112, the service provider computer, and the token service computer 110 can share information regarding installment plans that will be implemented by the authorizing entity computer. The service provider computer 108 and the token service computer 110 can facilitate the implementation and selection of installment plans by users conducting transactions at resource providers.

Each of the entities in FIG. 1 may communicate through any suitable communication channel or communications network. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Figure 2:
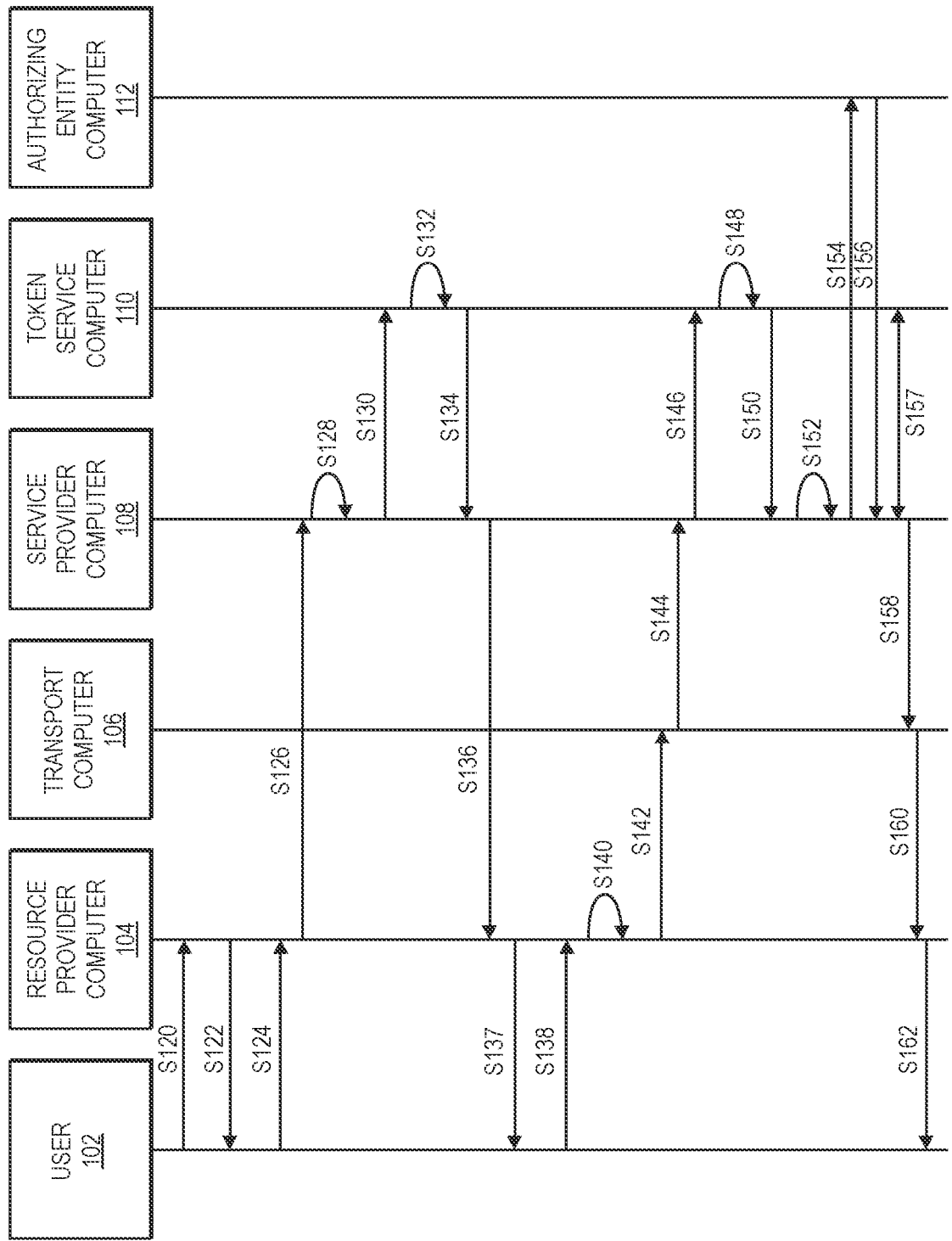
FIG. 2 shows a flow diagram illustrating methods conducted using the transaction processing system.

FIG. 2 shows a shows a flow diagram illustrating that can be used to illustrate methods according to embodiments of the invention. The method of FIG. 1 can involve a user 102, a resource provider computer 104, a transport computer 106, a service provider computer 108, a token service computer 110, and an authorizing entity computer 112.

In step S120, the user 102 initiates an interaction with the resource provider computer 104 by using a user device such as a physical payment card. In some embodiments, the resource provider computer 104 can be a card terminal that reads the chip information (e.g., a PAN, CVV, expiration date, etc.) from a chip on the physical payment card. In another embodiment, the resource provider computer 104 can be a Web server that operates a merchant Web site. In both cases, the user 102 may wish to obtain a resource such as a good or service from the resource provider in a purchase transaction.

In step S122, in a physical point of sale transaction, the resource provider computer 104 obtains the chip information (e.g., a PAN) from the payment card of the user 102. For example, the user 102 can tap or insert the payment card into the resource provider computer 104, such that information from the payment card can be read and obtained by the resource provider computer 104. Such information can include a real credential such as a primary account number (e.g., a credit, debit, or stored value account number) associated with the payment card and a cryptogram associated with the real credential. The cryptogram may have been generated by encrypting data associated with the real credential and other data (e.g., static data such as an expiration date or dynamic data such as a counter and/or a transaction amount) using a cryptographic key known to the authorizing entity computer 112 and/or the service provider computer 108. The authorizing entity computer 112 and/or the service provider may have preloaded the cryptographic key on the user device operated by the user.

After the user device interacts with the resource provider computer 104, the resource provider computer 104 can provide an option to the user 102 on a display screen to pay the amount in full or to pay in installments with an installment plan.

In step S124, the user 102 can provide a selection to the resource provider computer 104 to pay for the current transaction in installments. The user 102 can pick an installment plan identifier from a plurality of installment plan identifiers.

In step S126, the resource provider computer 104 submits a request with the credential obtained from the user device, the cryptogram, and optionally other information including a username, expiration date, etc. to the service provider computer 108 for available installment plan offers. In some embodiments, the request may be in the form of a token request message. The token request message can be in a communication format that is different than an authorization request message that is used by the resource provider computer 104 to seek authorization for a transaction. For example, the token request message may be in the form of an e-mail, a short messaging service (SMS) message, a multimedia messaging service (MMS) message, a hypertext transfer protocol (HTTP) request message, a transmission control protocol (TCP) packet, a web form submission, etc., while the authorization request message can be in a different data format such as an ISO 8583 data format.

In step S128, the service provider computer 108 validates the credential and the cryptogram. For example, the service provider computer 108 can validate the credential by checking to see if it is on a negative list and can check the cryptogram using a corresponding cryptographic key that was used to create the cryptogram. The service provider computer 108 can decrypt the cryptogram using the corresponding key and can verify that the recovered data matches data that the service provider computer 108 expects. In other embodiments, the service provider computer 108 can encrypt the data that is expected to be encoded by the cryptogram and can determine if that encrypted data matches the cryptogram.

Upon validation, the service provider computer 108 retrieves supplemental data identifiers such as installment plan IDs for installment plans that can be used with the credential. Exemplary installment plans can include a 6 month payment plan, 12 month payment plan, etc. For example, if the purchase transaction is for $120, then example installment plans may include: plan a) paying $60 now and $60 in six months; and plan b) paying $10 per month for 12 months. Appropriate fees may be also added for each of the installment options or the amounts to be paid may differ from those above and may include the fees. Each plan can include a supplemental data identifier such as a plan identifier. For instance, the supplemental data identifiers or installment plan identifiers could be "plan a)," and "plan b)."

In step S130, the supplemental data identifiers such as the installment plan identifiers, the credential, and the cryptogram are then sent (e.g., transmitted) to the token service computer 110.

In step S132, after receiving the supplemental data identifiers such as the installment plan identifiers, the credential, and the cryptogram, the token service computer 110 recognizes the installment plan identifiers and then obtains (e.g., creates or retrieves) tokens and optionally new token cryptograms for each of the installment plan identifiers. Each installment plan token and its associated token cryptogram can be mapped to corresponding installment plan identifier, the credential, and the credential cryptogram received from the service provider computer 108.

Each token cryptogram can be produced by encrypting data associated with the token, and optionally the plan identifier and a transaction channel indicator. The transaction channel indicator can be used to ensure that the token is being used in an authorized transaction channel. For example, a transaction channel indictor for physical point of sale transactions can be encoded in the cryptogram along with the token. When a transaction is conducted using the token, the cryptogram can be decrypted and the token service computer can determine if the transaction is or is not being conducted in an authorized transaction channel. If it is not, then then the transaction can be declined. If it is, then the processing of the transaction can continue.

In step S134, the tokens and their associated cryptograms are sent (e.g., transmitted) back to the service provider computer 108 along with the installment plan identifiers and details of the installment plans associated with the installment plan identifiers. In some embodiments, two or more tokens are sent to the service provider computer 108 along with two or more supplemental data identifiers.

In step S136, after receiving the tokens and their associated cryptograms, the service provider computer 108 sends the tokens, their associated cryptograms, the installment plan identifiers, and the details of the installment plans (examples of pieces of supplemental data) associated with the installment plan identifiers to the resource provider computer 104 (if they were not previously transmitted to the resource provider computer 104). The details of the installment plans can be presented to the user 102 and the user can select one of the installment plans. The details of each installment plans can include the amount that the user needs to pay per month, a total length of the installment plan, a plan description, etc.

In step S137, the resource provider computer 104 displays the installment plan options by providing the details of each installment plan including the installment plan identifier to the user 102. For example, if the service provider computer 108 sends information regarding installment plans A, B, and C to the resource provider computer 104, the resource provider computer 104 can display the details of plans A, B, and C (or any suitable subset thereof) to the user 102. The resource provider computer 104, can also provide an option for the user to pay for the transaction in full to override the user's prior decision to pay using installments.

In step S138, the user 102 can select one of the installment plans presented (e.g., displayed) by the resource provider computer 104 to the user 102.

In step S140, after receiving the selection of the installment plan, the resource provider computer 104 can generate an authorization request message comprising the token associated with the selected installment plan, an associated cryptogram, and value associated with the transaction. In some embodiments, the value can be a transaction amount for the transaction, which may be a purchase transaction. In some embodiments, the supplemental data identifier such as an installment plan identifier associated with the selected installment plan can be included in the authorization request message in a data field reserved for application data for an authorizing entity operating the authorizing entity computer 112. In other embodiments, the service provider computer 108 can determine the selected installment plan identifier using the token in the authorization request message. The service provider computer 108 can then generate a modified authorization request message with a real credential associated with the token and the selected installment plan identifier.

In step S142, after the resource provider computer 104 receives the authorization request message, the resource provider computer 104 sends the authorization request message to the transport computer 106.

In step S144, after the transport computer 106 receives the authorization request message, the transport computer 106 sends the authorization request message to the service provider computer 108. The service provider computer 108 can analyze the authorization request message and can determine that it contains a token and not a real credential. In some embodiments, the token can have a certain set of numbers which can indicate that it is a token and is not a real credential.

In step S146, after the service provider computer 108 determines that the authorization request message contains the token and needs to obtain the real credential associated with the token, the service provider computer 108 sends the token and associated cryptogram to the token service computer 110 and a de-tokenization request message.

In step S148, the token service computer 110, upon receiving the token and the cryptogram, recognizes that the authorization request message is associated with an installment transaction. In some embodiments, the token service computer 110 can perform a lookup in a database and can determine that the token is associated with installment plan data including an installment plan identifier. The token service computer 110 can then verify the token and its associated cryptogram. As noted above, the token service computer 110 can verify the cryptogram by either decrypting the cryptogram by obtaining the plaintext data and comparing the plaintext data to expected plaintext data. Alternatively, the token service computer 110 can encrypted data that is expected to be in the cryptogram and can then determine if the encrypted data matches the received cryptogram. The token service computer 110 can also verify that the transaction is being conducted in the correct transaction channel. For instance, token service computer 110 can recover a transaction type indictor from the cryptogram and compare it to the type of transaction being conducted. If the data are consistent, then the use of the token is authorized.

After the token and the cryptogram have been verified, the token service computer 110 then obtains their associated credential and cryptogram. The token service computer 110 can also identify the installment plan and the installment plan identifier associated with the token.

In step S150, the token service computer 110 sends the installment plan identifier associated with selected installment plan, the credential, and the cryptogram to the service provider computer 108 in a de-tokenization response message.

In step S152, the service provider computer 108 modifies the authorization request message to include the credential, the cryptogram, and the selected installment plan identifier. In some embodiments, the installment plan identifier can be present in a data field such as an issuer discretionary data data field in the authorization request message.

In step S154, the service provider computer 108 sends the authorization request message to the authorizing entity computer 112. The authorizing entity computer 112 can then decide whether to authorize the interaction. For example, the authorizing entity computer 112 can determine if the amount in the authorization request message exceeds a balance or credit amount associated with an account of the user 102. The authorizing entity computer 112 can also perform any fraud or security analyses on the authorization request message. The authorizing entity computer 112 can also note that the authorization request message contains an installment plan identifier in data field such as an issuer application data data field. The authorizing entity computer 112 can then store the installment plan identifier along with a transaction identifier for the transaction, so that the authorizing entity computer 112 can subsequently implement the selected installment plan.

In step S156, after deciding whether or not to authorize the transaction, the authorizing entity computer 112 generates and sends an authorization response message to the service provider computer 108 that indicates whether the interaction is authorized. In some embodiments, the authorization response message can also include the credential and the selected installment plan identifier.

In step S157, the service provider computer 108 can communicate with the token service computer 110 to obtain the credential associated with the token.

In steps S158, S160, and S162, the service provider computer 108 sends the authorization response message to the transport computer 106, the transport computer 106 sends the authorization response message to the resource provider computer 104, and the resource provider computer 104 provides the result of the authorization response message to the user 102. The authorization response message can include the token instead of the real credential in steps S158, S160, and S162.

At a later time, a clearing and settlement process can occur. The authorizing entity computer 112 can settle with the resource provider operating the resource provider computer 104 for the full amount of the transaction. The authorizing entity computer 112 can then implement an installments plan associated with the selected installments plan identifier. For example, the authorizing entity computer 112 can provide notifications of smaller amounts than the transaction amount to the user 102 over time. For instance, although the authorizing entity computer 112 has settled the transaction for the entire amount with the resource provider operating the resource provider computer 104, the authorizing entity computer 112 can invoice the user 102 at the intervals (e.g., monthly) identified in the selected installment plan.

Note that although installment plans are discussed in detail, embodiments of the invention can be used in any context in which extra data is needed to perform transactions, but it would be difficult to modify existing front end systems to process the extra data.

Below is an example of embodiments of the invention. A PAN (primary account number) example can be from a non-tokenized transaction, and a token example can illustrate how an installment transaction according to an embodiment of the invention can work.

If an exemplary PAN is 494283XXXXXX1234 (where X represents a number), the process flow would be as follows. A user can tap their user device against a resource provider computer, and the PAN 494283XXXXXX1234 along with other data is received from the user device by the resource provider computer (e.g., a POS terminal). All chip data including the PAN that is received by terminal is as follows (in Tag Length Value):

82 02 2000
84 07 A0000000031010
95 05 0000000000
9A 03 210721
9C 01 00
5F2A 02 0036
9F02 06 000000000010

-continued

```
9F03 06 000000000000
9F10 07 06011203A00000
9F1A 02 0036
9F26 08 AFABE52CFF231B5C
9F27 01 80
9F33 03 606848
9F34 03 3F0300
9F36 02 000F
9F37 04 F9D14F9E
9F6E 04 20700000
5F34 01 01 [Note: this tag is not included in F55 in the authorization
request message, it is included in F23]
```

The above data can be labeled as "Data1."

All this information would be sent to the service provider computer in an eligibility check. The service provider computer could validate that the information is correct, and could respond with data packets for each eligible plan and no plan:

```
NO_PLAN: PAN|Data1
PLAN_A: TokenA|Data2|InstallmentPlanAInformation
PLAN_B: TokenB|Data3|InstallmentPlanBInformation
```

In this example, the user would then be prompted between Plans A and B, and no plan. If the user chooses NO_PLAN, the then the authorization request message could include Data 1.

However, if Plan A is chosen, the information as shown below would be used, resulting in the message in the token example. Specifically, the resource provider computer could disregard the information obtained from the card and overwrite it using the information received from the service provider computer pursuant to PLAN_A. Note that the changes have been to Tag 2 (replacing the PAN 494283XXXXXX1234 with the token 499999XXXXXX5678) and Field 55 (see the italicized text below—these are variables that can be overwritten by the resource provider computer or the service provider computer). If PLAN_B is selected, it could either use the same token or a different one.

outside of the chip data. This framework could be generalized to card not present transactions.

Figure 3:
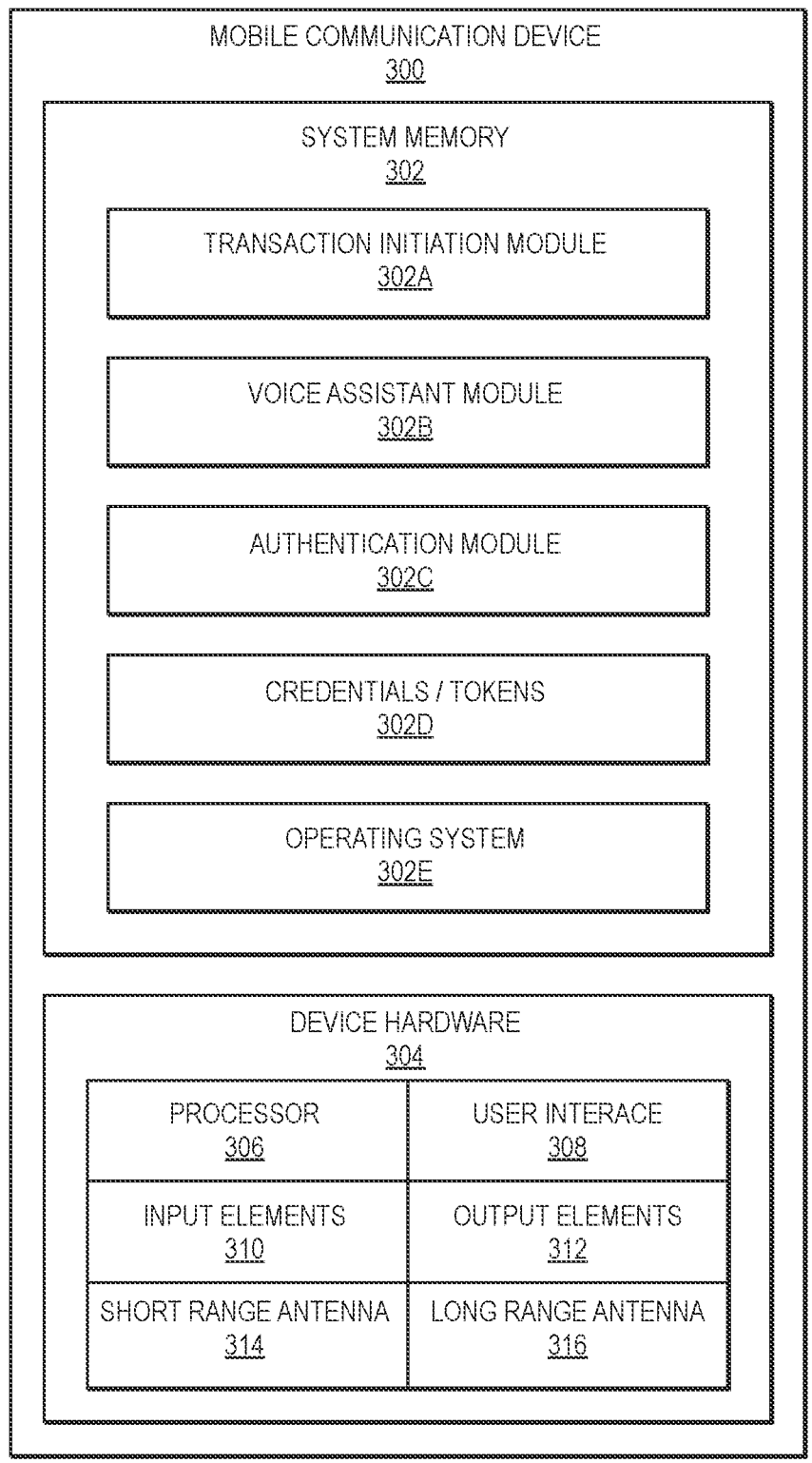
FIG. 3 shows a block diagram of a communication device according to an embodiment.

FIG. 3 illustrates a mobile communication device 300 according to an embodiment. Mobile communication device 300 may include device hardware 304 coupled to a system memory 302.

Device hardware 304 may include a processor 306, a short range antenna 314, a long range antenna 316, input elements 310, a user interface 308, and output elements 312 (which may be part of the user interface 308). Examples of input elements may include microphones, keypads, touchscreens, sensors, etc. Examples of output elements may include speakers, display screens, and tactile devices. The processor 306 can be implemented as one or more integrated circuits (e.g., one or more single core or multicore microprocessors and/or microcontrollers), and is used to control the operation of mobile communication device 300. The processor 306 can execute a variety of programs in response to program code or computer-readable code stored in the system memory 302, and can maintain multiple concurrently executing programs or processes.

The long range antenna 316 may include one or more RF transceivers and/or connectors that can be used by mobile communication device 300 to communicate with other devices and/or to connect with external networks. The user interface 308 can include any combination of input and output elements to allow a user to interact with and invoke the functionalities of mobile communication device 300. The short range antenna 809 may be configured to communicate with external entities through a short range communication medium (e.g., using Bluetooth, Wi-Fi, infrared, NFC, etc.). The long range antenna 819 may be configured to communicate with a remote base station and a remote cellular or data network, over the air.

The system memory 302 can be implemented using any combination of any number of non-volatile memories (e.g., flash memory) and volatile memories (e.g., DRAM, SRAM), or any other non-transitory storage medium, or a combination thereof media. The system memory 302 may store computer code, executable by the processor 805, for performing any of the functions described herein.

```
82 02 2000
84 07 A0000000031010
95 05 0000000000
9A 03 210721
9C 01 00
5F2A 02 0036
9F02 06 000000000010
9F03 06 000000000000
9F10 20
1F58010000000044PPPPPPPPPP00000000000000000000000000000000000000
9F1A 02 0036
9F26 08 QQQQQQQQQQQQQQQQ
9F27 01 80
9F33 03 606848
9F34 03 3F0300
9F36 02 0001
9F37 04 ABCDEF12
9F6E 04 20700000
5F34 01 01 [Note: this tag is not included in F55 in the authorization request message, it
is included in F23]
```

The installment plan identifier could then be included in Tag 9F10 (a tag for issuer application data), replacing the P's. Note that this is just an example. This could be generalized and carry more information in some of the data elements. To an acquirer, the two messages look identical The system memory 302 may also store a transaction initiation module 302A, a voice assistant module 302B, an authentication module 302C, credentials 302D, and an operating system 302E, The transaction initiation module 302A may include instructions or code initiating and conducting a transaction with an external device such as an access device or a processing computer. It may include code, executable by the processor 306, for generating and transmitting authorization request messages, as well as receiving and forwarding authorization response messages. It may also include code, executable by the processor 306, for forming a local connection or otherwise interacting with an external access device. The voice assistant module 302B may comprise code, executable by the processor 306, to receive voice segments, and generate and analyze data corresponding to the voice segments. The authentication module 302C may comprise code, executable by the processor 306, to authenticate a user. This can be performed using user secrets (e.g., passwords) or user biometrics.

System memory 302 may also store credentials and/or tokens 302D. Credentials may also include information identifying the mobile communication device 300 and/or the user of the mobile communication device 300. Examples of credentials may include a public key associated with the mobile communication device 300 and/or a user of the mobile communication device 300, a digital signature (e.g., the public key of the mobile communication device 300 signed by a key of the authentication system), payment credentials, cryptograms, biometric data (e.g., biometric samples or templates), etc.

Figure 4:
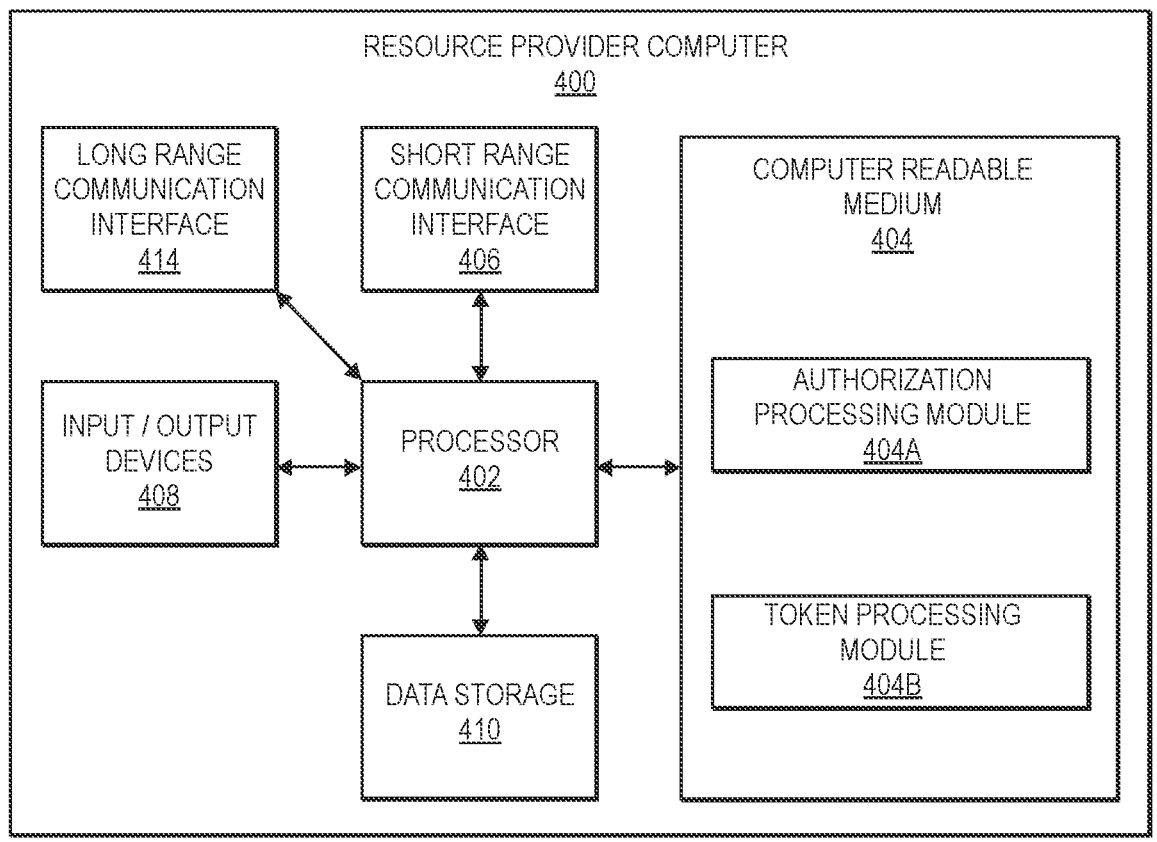
FIG. 4 shows a block diagram of a resource provider computer according to an embodiment.

FIG. 4 shows a block diagram showing components in an exemplary resource provider computer 400. The resource provider computer 400 may comprise a processor 402. It may also comprise a computer readable medium 404, a short range communication interface 406, a long range communication interface 414, a data storage 410, and input/output devices operationally coupled to the processor 402. The shod range communication interface 406 can allow the resource provider computer 400 to communicate with user devices and other devices via short range communication signals such as NFC, Bluetooth, or Wi-Fi signals. The long range communication interface 414 can allow the resource provider computer 400 to communicate with entities such as the previously described transport computer, the service provider computer, and the authorizing entity computer.

The input/output devices 408 can include display screens, keyboards, touchpads, cameras, microphones, speakers, and the like.

The computer readable medium 404 may further comprises an authorization processing module 404A and a token processing module 404B.

The authorization processing module 404A and the processor 402 can perform any of the above-described authorization processing steps including generating or modifying authorization request messages, and communicating with users and/or user devices.

The token processing module 404B and the processor 402 can perform any of the above described token processing steps including generating and transmitting token request messages, and receiving and processing token response messages. The token processing module 404B may be created according to an API that interfaces with the service provider computer.

Figure 5:
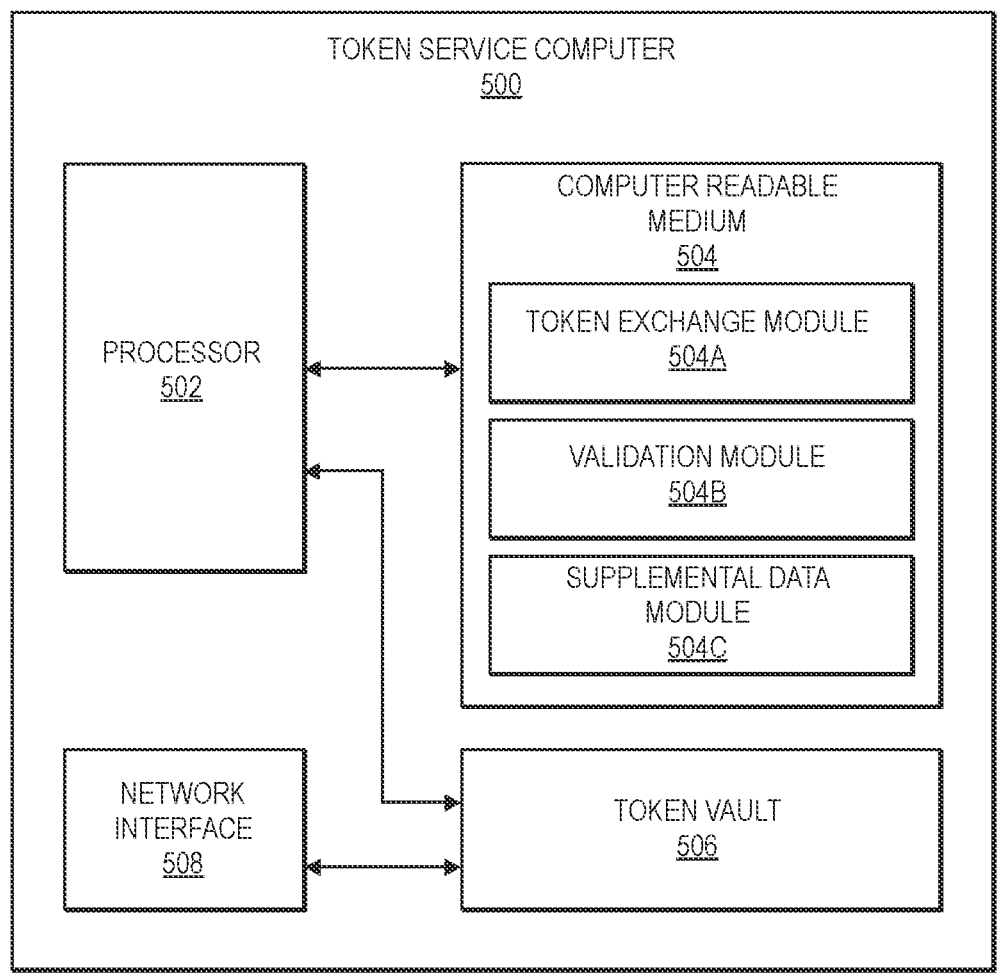
FIG. 5 shows a block diagram of a token server computer according to an embodiment.

FIG. 5 shows a token service computer 500. The token service computer 500 includes a processor 502 and a computer readable medium 504, a token vault 506, and a network interface 508 coupled to the processor 502.

The token vault 506 may store tokens and their associated credentials and cryptograms in a database. Supplemental data including supplemental data identifiers such as installment plan identifiers can also be stored along with tokens and credentials in the token vault 506. The token vault 506 may store data in a database such as an Oracle™ database.

The computer readable medium 504 may comprise a token exchange module 504A, a validation module 504B, and a supplemental data module.

The tokenization exchange module 504A may comprise code that causes the processor 502 to provide access tokens. For example, the token exchange module 504A may contain logic that causes the processor 502 to generate a payment token and/or associate the payment token with a set of payment credentials. A token record may then be stored in a token record database indicating that the payment token is associated with a certain user or a certain set of payment credentials.

The validation module 504B may comprise code that causes the processor 502 to validate token requests before a payment token is provided. For example, validation module 504B may contain logic that causes the processor 502 to confirm that a token request message is authentic by decrypting a cryptogram included in the message, by confirming that the payment credentials are authentic and associated with the requesting device, by assessing risk associated with the requesting device.

The supplemental data module 504C and the processor 502 can maintain mappings between supplemental data, supplemental data identifiers, tokens, and credentials in the token vault 506.

The computer readable medium 604 can also comprise code, executable by the processor 502 to perform a method comprising: receiving, from a service provider computer, a credential and the one or more supplemental data identifiers; providing, to the service provider computer, one or more tokens linked to the one or more supplemental data identifiers, and the one or more supplemental data identifiers linked to one or more pieces of supplemental data; receiving, from the service provider computer, a de-tokenization request message comprising a selected token of the one or more tokens; and transmitting, to the service provider computer, the credential associated with the selected token, wherein the service provider computer thereafter transmits a modified authorization request message with the credential, a supplemental data identifier selected by a user, and an amount to an authorizing entity computer.

Figure 6:
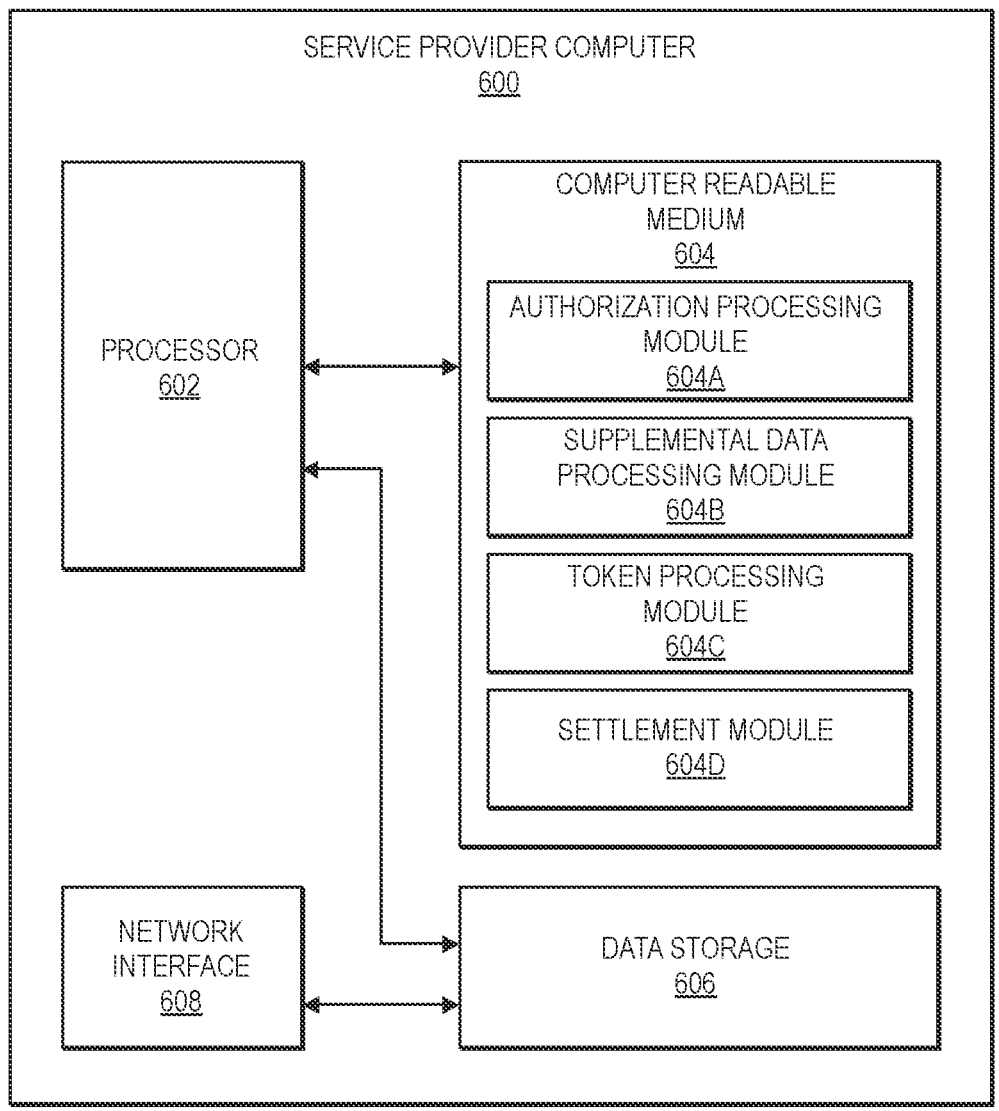
FIG. 6 shows a block diagram of a service provider computer according to an embodiment.

FIG. 6 shows a block diagram of a service provider computer 600 according to an embodiment. The service provider computer 600 may comprise a processor 602, which may be coupled to a computer readable medium 604, data storage 606, and a network interface 608. The data storage 606 may contain tokens and supplemental data and supplemental data identifiers.

The computer readable medium 604 may comprise a number of software modules including an authorization processing module 604A, a supplemental data processing module 604B, and a settlement module 604C.

The authorization processing module 604A may comprise code that can cause the processor 602 to evaluate authorization request messages for transactions and determine if the transactions should be authorized. The authorization processing module 604A may also include code for routing or modifying authorization request and response messages as they pass between various parties such as authorizing entity computers (e.g., issuer computers) and transport computers (e.g., acquirer computers).

The supplemental data processing module 604B can comprise code that can cause the processor 602 to process supplemental data. The supplemental data processing module 604B and the processor 602 can process supplemental data and their identifiers, and can work in conjunction with the token processing nodule 604C.

The token processing module 604C and the processor 602 can recognize a token in an authorization request message and can communicate with a token service computer.

The computer readable medium 604 can also include a settlement module 604D may comprise code that causes the processor 602 to generate messages, forward clearing and settlement messages to coordinate settlement between authorizing entity computers and transport computers.

The computer readable medium 604A can comprise code, executable by the processor 602 to perform a method comprising: receiving, from a resource provider computer, a token request message comprising a credential, after a user provides the credential to the resource provider computer; transmitting, to the resource provider computer, a token response message comprising one or more supplemental data identifiers and one or more tokens associated with the one or more supplemental data identifiers, the one or more tokens linked to the credential, wherein the user thereafter selects a supplemental data identifier; receiving, from the resource provider computer, an authorization request message comprising a token of the one or more tokens, the token linked to the selected supplemental data identifier, and a value; determining the credential using the token; and transmitting, to an authorizing entity computer, a modified authorization request message comprising the credential, the value, and the supplemental data identifier.

Embodiments have number of advantages. One advantage is that a transport computer does not have to implement extra logic to accommodate installment plan option in the authorization request message. Another advantage is that tokenizing the installment plan warrants that the transport computer route to a correct service provider computer to de-tokenize the installment plan token. A further advantage is that real credentials are not transmitted in the authorization request messages that pass from the resource providers to the service provider computer, this decreasing the chances of successful man-in-the-middle attacks.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   receiving, by a service provider computer from a resource provider computer, a token request message comprising a credential, after a user provides the credential to the resource provider computer;
   transmitting, by the service provider computer to the resource provider computer, a token response message comprising two or more supplemental data identifiers and two or more tokens associated with the two or more supplemental data identifiers, the two or more tokens linked to the credential, wherein the user thereafter selects only one supplemental data identifier from the supplemental data identifiers;
   receiving, by the service provider computer from the resource provider computer, an authorization request message comprising a token of the two or more tokens, the token linked to the selected supplemental data identifier, and a value;
   determining, by the service provider computer, the credential using the token;
   determining, by the service provider computer, the supplemental data identifier selected by the user using the token by searching a database for the supplemental data identifier using the token;
   creating, by the service provider computer, the modified authorization request message using the determined token, the determined supplemental data identifier, and the value; and
   transmitting, by the service provider computer to an authorizing entity computer, a modified authorization request message comprising the credential, the value, and the supplemental data identifier.

2. The method of claim 1, wherein the supplemental data identifier comprises a plan identifier.

3. The method of claim 1, further comprising:
   transmitting, by the service provider computer, two or more pieces of supplemental data associated with the two or more supplemental data identifiers.

4. The method of claim 1, wherein the authorizing entity computer implements a plan with respect to the user and the credential after receiving the modified authorization request message.

5. The method of claim 1, further comprising, after receiving the token request message:
   transmitting, by the service provider computer to a token service computer, the credential and the two or more supplemental data identifiers; and
   receiving, by the service provider computer from the token service computer, the two or more tokens.

6. The method of claim 5, further comprising:
receiving, by the service provider computer from the token service computer, two or more token cryptograms associated with the one or more tokens.

7. The method of claim 6, wherein the token request message also comprises a credential cryptogram associated with the credential.

8. The method of claim 1, wherein the supplemental data identifier is present in a data field in the authorization request message reserved for application data for an authorizing entity operating the authorizing entity computer.

9. The method of claim 1, wherein the credential and the token have the same data format.

10. The method of claim 1, wherein the value is an amount, and wherein the authorizing entity computer implements a plan with respect to the user and the credential after receiving the modified authorization request message, the plan providing notifications of smaller amounts than the amount to the user over time.

11. The method of claim 1, wherein the token request message is in a first data format and the authorization request message is in a second data format.

12. The method of claim 11, wherein the first data format is an HTTP data format and the second data format is in an ISO 8583 data format.

13. The method of claim 1, wherein the user provides the credential to the resource provider computer using a user device that contains the credential.

14. The method of claim 1, wherein the tokens are payment tokens.

15. The method of claim 1, wherein the resource provider computer is a merchant computer.

16. The method of claim 1, wherein the supplemental data identifiers comprise installment plan identifiers.

17. A service provider computer comprising:
a processor; and
a non-transitory computer readable medium comprising code, executable by the processor, to perform operations comprising:
receiving, from a resource provider computer, a token request message comprising a credential, after a user provides the credential to the resource provider computer;
transmitting, to the resource provider computer, a token response message comprising two or more supplemental data identifiers and two or more tokens associated with the one or more supplemental data identifiers, the two or more tokens linked to the credential, wherein the user thereafter selects only one supplemental data identifier from the two or more supplemental data identifiers;
receiving, from the resource provider computer, an authorization request message comprising a token of the two or more tokens, the token linked to the selected supplemental data identifier, and a value;
determining the credential using the token;
determining, by the service provider computer, the supplemental data identifier selected by the user using the token by searching a database for the supplemental data identifier using the token;
creating, by the service provider computer, the modified authorization request message using the determined token, the determined supplemental data identifier, and the value; and
transmitting, to an authorizing entity computer, a modified authorization request message comprising the credential, the value, and the supplemental data identifier.

18. The service provider computer of claim 17, wherein the token and the credential each comprises 16 digits.

19. A method comprising:
receiving, by token service computer from a service provider computer, a credential and two or more supplemental data identifiers;
providing, by the token service computer to the service provider computer, two or more tokens linked to the two or more supplemental data identifiers, and the two or more supplemental data identifiers linked to two or more pieces of supplemental data;
receiving, by the token service computer from the service provider computer, a de-tokenization request message comprising a selected token of the two or more tokens, the selected token being selected as a result of a user selecting only one of the two or more supplemental data identifiers, the selected supplemental data identifier being linked to the selected token; and
transmitting, by the token service computer to the service provider computer, the credential associated with the selected token,
wherein the service provider computer thereafter transmits a modified authorization request message with the credential, the supplemental data identifier selected by the user, and an amount to an authorizing entity computer.

20. The method of claim 19, wherein the service provider computer determines the supplemental data identifier using the selected token, and creates the modified authorization request message by modifying an authorization request message comprising the token, but not the supplemental data identifier.

* * * * *